(12) United States Patent
Boileau et al.

(10) Patent No.: US 11,740,011 B2
(45) Date of Patent: Aug. 29, 2023

(54) METHOD FOR PREPARING A COLD BEVERAGE

(71) Applicant: SOCIETE DES PRODUITS NESTLE S.A., Vevey (CH)

(72) Inventors: Vincent Boileau, Corcelles (CH); Damien Wyttenbach, Yverdon-les-Bains (CH); Cedric Beausire, Bavois (CH)

(73) Assignee: Societe des Produits Nestle S.A., Vevey (CH)

( * ) Notice: Subject to any disclaimer, the term of this patent is extended or adjusted under 35 U.S.C. 154(b) by 755 days.

(21) Appl. No.: 16/612,484

(22) PCT Filed: May 8, 2018

(86) PCT No.: PCT/EP2018/061816
§ 371 (c)(1),
(2) Date: Nov. 11, 2019

(87) PCT Pub. No.: WO2018/206550
PCT Pub. Date: Nov. 15, 2018

(65) Prior Publication Data
US 2020/0064055 A1 Feb. 27, 2020

(30) Foreign Application Priority Data
May 9, 2017 (EP) .................................... 17170168

(51) Int. Cl.
*F25D 23/12* (2006.01)
*A47J 43/046* (2006.01)
(Continued)

(52) U.S. Cl.
CPC ............ *F25D 23/12* (2013.01); *A47J 43/046* (2013.01); *A47J 43/0722* (2013.01);
(Continued)

(58) Field of Classification Search
CPC ................ A47J 43/046; A47J 43/0722; F25D 2303/0831; F25D 3/06; F25D 23/12; F25D 31/003; F25D 31/002; F25C 1/243
See application file for complete search history.

(56) References Cited

U.S. PATENT DOCUMENTS 3,685,785 A 8/1972 Brown
5,250,315 A 10/1993 Loew et al.
(Continued)

FOREIGN PATENT DOCUMENTS

CN 2717358 8/2005
EP 1059039 12/2000
(Continued)

OTHER PUBLICATIONS

English Langauge translation of CN 2717358 (Year: 2005).*
(Continued)

*Primary Examiner* — Cassey D Bauer
(74) *Attorney, Agent, or Firm* — K&L Gates LLP (57) ABSTRACT

The invention concerns a method for preparing a cold beverage with an apparatus (1) for mixing and storing a beverage, said apparatus comprising: —a container body (2), comprising a floor (21) and a sidewall (22) extending upwardly and longitudinally from the floor to an upper edge (221), —a removable and rotatable mixing device (23) positioned within the container body, —a motor (3) cooperating with the mixing device (23) through the floor of the container body in order to rotate the mixing device, wherein the method comprises the step of: —providing a mixing device (23), a part of said mixing device being covered with ice, —positioning said mixing device in the container body (2) in order to cooperate with the motor, —introducing at
(Continued)

least one beverage liquid in the container body, —actuating the motor (3) to rotate the mixing device in the at least one beverage liquid.

10 Claims, 9 Drawing Sheets

(51) Int. Cl.
    *A47J 43/07*         (2006.01)
    *F25C 1/243*        (2018.01)
    *F25D 3/06*         (2006.01)

(52) U.S. Cl.
    CPC ................ *F25C 1/243* (2013.01); *F25D 3/06* (2013.01); *F25D 2303/0831* (2013.01)

(56) References Cited

U.S. PATENT DOCUMENTS

| | | | |
|---|---|---|---|
| 9,689,606 B2 | 6/2017 | Bucceri | |
| 2005/0045671 A1* | 3/2005 | Beesley | A47J 27/004 222/559 |
| 2009/0186141 A1 | 7/2009 | Almblad et al. | |
| 2014/0047985 A1 | 2/2014 | Chen et al. | |

FOREIGN PATENT DOCUMENTS

| | | | | |
|---|---|---|---|---|
| EP | 1656866 | | 5/2006 | |
| EP | 2878245 A2 | | 6/2015 | |
| EP | 3130265 | | 2/2017 | |
| FR | 1210323 | | 3/1960 | |
| GB | 2250806 | | 6/1992 | |
| GB | 2464160 | | 4/2010 | |
| JP | S47037517 Y | | 11/1972 | |
| JP | 2006290469 A | | 10/2006 | |
| JP | 2015188539 A | | 11/2015 | |
| KR | 10-2015-0115129 | * | 10/2015 | ............. B01F 35/71 |
| WO | 2010128490 | | 11/2010 | |
| WO | 2011153587 | | 12/2011 | |
| WO | WO2015/132135 | * | 9/2015 | ............ A47J 43/042 |

OTHER PUBLICATIONS

English language machine translation of KR 20150115129 (translated Feb. 2023) (Year: 2015).*
Office Action Received for Application No. CN201880035441.1, dated Nov. 1, 2022, 7 Pages.

* cited by examiner

METHOD FOR PREPARING A COLD BEVERAGE

CROSS REFERENCE TO RELATED APPLICATIONS

The present application is a National Stage of International Application No. PCT/EP2018/061816, filed on May 8, 2018, which claims priority to European Patent Application No. 17170168.3, filed on May 9, 2017, the entire contents of which are being incorporated herein by reference

FIELD OF THE INVENTION

The present invention relates to a device and a method for preparing a cold beverage.

BACKGROUND OF THE INVENTION

It is known to rapidly prepare a beverage by dissolving a soluble beverage powder like instant coffee with hot water in a drinking cup. The soluble beverage is usually dosed from a jar or from a stick and water is heated in a kettle. This preparation is fully convenient and rapid, yet it rarely enables the optimal reconstitution of the beverage.

It has been proposed to improve such a preparation by providing mixing containers. These containers usually consist in a drinking container comprising a stirring device at the bottom of the container and optionally a heater in the floor or sidewalls of the container. The stirring device improves the dissolution of the beverage powder whatever the temperature of the diluent introduced therewith, and eventually enables frothing of the beverage. The heater enables the use of cold diluent and the use of a kettle to heat water is not needed any longer.

With such a device when a cold beverage has to be prepared, the heater is switched off and water at ambient temperature is used. Yet water at ambient temperature usually presents a temperature of about 20° C. Consequently, the resulting beverage is not really chilled: a temperature inferior to 10° C. cannot be obtained.

An object of the present invention is to provide a method to enable the preparation of a cold beverage with an apparatus for mixing, storing and drinking a beverage.

It would be advantageous to produce from water at ambient temperature a final cold beverage presenting a temperature far inferior to the initial ambient temperature.

SUMMARY OF THE INVENTION

In a first aspect of the invention, there is provided a method for preparing a cold beverage with an apparatus for mixing and holding a beverage, said apparatus comprising:
- a container body, comprising a floor and a sidewall extending upwardly and longitudinally from the floor to an upper edge,
- a removable and rotatable mixing device positioned within the container body,
- a motor cooperating with the mixing device through the floor of the container body in order to rotate the mixing device, wherein the method comprises the step of:
- providing a mixing device, a part of said mixing device being covered with ice,
- positioning said mixing device in the container body in order to cooperate with the motor,
- introducing at least one beverage liquid in the container body,
- actuating the motor to rotate the mixing device in the at least one beverage liquid.

According to the preferred embodiment, the apparatus used in the method is configured to enable a consumer to drink a beverage directly from the apparatus. In that embodiment, the apparatus is essentially a drinking container like a cup, a glass or a mug.

Whatever the embodiment, the apparatus comprises a container body. The container body comprises a floor and a sidewall extending longitudinally and upwardly from the floor to an upper edge. The container body enables in one mode the introduction of at least one beverage liquid to be cooled or in a second mode the introduction of beverage ingredients and the preparation of a cold beverage by mixing of said ingredients.

In the first mode, the beverage liquid can be a ready-to-drink beverage that needs to be cooled like coffee, tea chocolate, fruit juice. The ready-to-drink beverage can be the result of a previous preparation from a beverage preparation apparatus like a coffee, tea or chocolate machine or a machine for reconstituting smoothies or fruit juices, for example machines preparing beverages from capsules, sachets, packets or pouches. In the container, mixtures of liquids can also be introduced like coffee and milk, tea and milk, . . .

In the second mode, at least one of the beverage ingredients is a liquid, generally an aqueous liquid diluent enabling the dissolution of at least one soluble beverage ingredient. The liquid diluent is usually water and/or milk. The soluble beverage ingredient can be a beverage powder or a beverage concentrate. The beverage powder can be instant coffee powder, 3-in-1 coffee mixes, milk powder, instant tea powder, chocolate powder, soup powder, fruit juice powder. The beverage concentrate can be coffee concentrate, tea concentrate, chocolate concentrate, syrups, fruit juice concentrates.

According to one preferred embodiment, the container body presents an internal volume configured for preparing a beverage for one person, that is to say the volume of a mug. The container body can present an internal volume of about 300 ml. Such an internal volume enables the preparation of beverages with a volume of about 200 ml since the liquid is able to swirl in the container body.

The apparatus comprises a mixing device positioned within the container body. This mixing device is configured for mixing the at least one soluble beverage ingredient and the at least one aqueous liquid diluent introduced in the container body. This mixing device can be a blade, a whipper, a stirrer, a whisk such as a toroidally-shaped coil or any equivalent device configure to agitate a beverage. The mixing device is generally positioned on or close to the floor of the container body. Generally the mixing device is configured to rotate around the longitudinal axis of the container body.

The apparatus comprises a motor to rotate the mixing device. The motor is generally a rotating motor comprising a drive shaft cooperating directly or indirectly with the mixing device through the floor of the container body.

According to one mode, the mixing device can be mechanically attached or connectable to the shaft of the motor (direct cooperation).

According to another preferred mode, the motor can drive the mixing device through a magnetic drive effect through the floor of the container body (indirect cooperation).

Generally the mixing device comprises a connecting means designed to removably engage with a corresponding positioning means at the floor of container body of the apparatus.

This positioning means enables the correct positioning of the mixing device relatively to the shaft of the motor in order to provide an efficient driving of the mixing device.

Preferably, the mixing device comprises at least one magnetically slaved portion and the motor is arranged to drive the mixing device by generating a rotating magnetic field in the container.

According to this embodiment, preferably the positioning means at the floor of container body is a bump or relief raising from the floor of the container body and the connecting means of the mixing device is a slot designed to engage with said bump or relief.

Preferably, and in particular if the apparatus is essentially a drinking container like a cup, a glass or a mug, the apparatus comprises a removable lid configured for cooperating with the upper edge of the container body. The lid is removable in order to enable the introduction of the beverage ingredients and the cleaning of the apparatus. Once the lid cooperates with the upper edge, the lid closes the container body hermetically. The lid and the container upper edge can cooperate through screwing means or any other means like raised parts slidably engaging with cooperating slots or like cooperating parts engaging by snap fitting.

Usually, the lid comprises one first opening drinking aperture. By opening it is meant a hole traversing the lid from the bottom to the top and enabling fluid communication between the container body and the atmosphere. This first opening is configured as a beverage outlet. Its function is to enable the customer to sip the beverage. It is positioned close to the edge of the lid. It is preferably sufficiently large to dispense a drinking flow of beverage.

Preferably, the lid comprises one second opening configured as an air port. Its main function is to enable pressurised air or gases to escape from the container body. Preferably, this second opening presents a small cross section compared to the first opening.

Usually, the lid comprises a member configured for closing or opening the first opening and movable between a first closing position and a second opening position. The function of this member is to close the beverage outlet during the steps there is a risk the beverage unexpectedly overflows, in particular during mixing operation or during travelling. On the contrary, the member enables the beverage outlet opening during drinking.

In the method for preparing a cold beverage with the above apparatus there is provided a mixing device, a part of said mixing device being wrapped in or covered with ice. This mixing device partially covered by ice is positioned in the container body in order to cooperate with the motor. Then the at least one soluble beverage ingredient and the at least one aqueous liquid diluent necessary for the preparation of the beverage are introduced in the container and the motor is actuated to rotate the mixing device in the liquid.

While the mixing device is rotated in the liquid, the ice surrounding a part of the mixing device chills the beverage in preparation. Simultaneously the ice melts and provides additional liquid for the beverage preparation. At the end of the preparation, the temperature of the beverage is colder than the temperature of the liquid introduced in the container.

According to one embodiment, the apparatus can be the assembly of two parts. One upper part is deprived of motor and comprises the container and the mixing device whereas one lower part is a docking station comprising the motor and the energy supply and designed for receiving the container body. The mixing operation happens when the container is received in the docking station only. Once the mixing operation is terminated, the container can be removed from the docking station to travel and drink.

According to another embodiment, the motor for actuating the mixing device, the heating device, the battery for supplying these devices with energy are positioned under the floor of the container body at the bottom of the device.

In one embodiment, the apparatus can comprise a heater and the heater can be switched on before and/or at the beginning of the step of actuating the motor to rotate the mixing device in the at least one beverage liquid.

The heater can be positioned on the external sides of the container body, for example the heating device can be a heating resistive ring.

The heating device can be positioned at the bottom of the container body, for example the heating device can be a heating stick or a serigraphic heating plate.

In the method, the short heating step aims to melting the surface of the ice covering the mixing device, in particular the surface of the mixing device laying above the floor of the container. As a result, if the ice covering the mixing device defines an imperfect plane surface, surface defaults rapidly melt and the rotation of the mixing device remains efficient.

In a second aspect, there is provided a mould for freezing an ice shape from water around the mixing device of an apparatus for mixing, storing and drinking a beverage, said mixing device being configured to rotate inside said apparatus and said mixing device comprising a connecting means designed to removably engage with a positioning means inside the apparatus, wherein said mould comprises a compartment for receiving and storing water and the mixing device, and wherein the bottom of the compartment presents a means to fix the mixing device inside the compartment, said fixing means engaging with the connecting means of the mixing device.

The means for fixing the mixing device inside the compartment enables the correct positioning of the mixing device in the compartment during the freezing operation and guarantees that ice surrounds the mixing device as desired.

Moreover, this fixing means engage with the connecting means of the mixing device designed to removably engage with a positioning means inside the apparatus. As a result the fixing means prevents the freezing of ice in this connecting means of the mixing device. Generally, the fixing means of the compartment presents a shape designed to match with the connecting means of the mixing device. Generally, the fixing means of the compartment presents a shape at least as large as the external shape of the positioning means of the apparatus. By as large, it is meant that the shape of the fixing means is able to comprise the shape of the positioning means of the apparatus.

Preferably, the compartment presents a shape designed so that, when the mixing device is engaged with the fixing means of the compartment, the end part of the mixing device opposed to the connecting means juts over the upper edge of the compartment.

Consequently, after freezing of water in the compartment, the end part of the mixing device is not surrounded by ice and can be easily picked up to be removed from the compartment and further inserted in the container of the apparatus.

Generally the compartment comprising at least one upper opening.

Preferably, the upper surface of the bottom of the compartment moulds the lower surface of the mixing device. As a result no ice is able to cover the bottom surface of the mixing device and, in the mixing, storing and drinking apparatus, the cooperation of the mixing device with the motor through the floor of the container body is not affected.

Accordingly, the bottom of the compartment presents generally a recess around the fixing means, said recess being designed to fit with the bottom surface of the mixing device.

Even more preferably, the upper surface of the bottom of the compartment moulds the lower surface of the mixing device perfectly Preferably the mould is made of a flexible and resilient material. By flexible and resilient, it is meant a material that can be deformed for a moment and can retrieve its original shape even at low temperature. Accordingly, it becomes easier for the user to remove the mixing device partially surrounded by ice from the mould. The material can be a soft plastic like a silicone plastic.

According to the preferred embodiment, the volume of the compartment is comprised between 35 and 45 ml, preferably is of about 40 ml. Accordingly the volume of ice surrounding the mixing device remains inferior to 45 ml and, when used for cooling a beverage, the resulting defrost water does not dilute significantly the single serve beverage. Yet this volume of ice is sufficient to decrease the temperature of a beverage of about 180 ml and presenting a temperature of about 20° C. to a final temperature inferior to 10° C. and even inferior to 5° C.

Preferably, the internal shape of the compartment is designed to mould an ice shape around the mixing device, said shape presenting rotational symmetry around the axis of rotation of the mixing device.

Consequently, the resulting mixing device covered with ice presents a rotational symmetry and the rotation of such a mixing device is facilitated compared to a mixing device with asymmetric shape. The rotation of the latter by the motor would be more difficult and the rapid dissolution of the ice would not be reached.

For example, the internal shape of the compartment can be designed to mould a cylinder of ice around the mixing device or a shape of cone or top over the mixing device.

In one embodiment, the compartment is an assembly of an upper and a lower dismountable parts said parts being configured to surround the mixing device when said parts are attached one to the other.

This embodiment presents the advantage of providing a more secure way to hold the mold comprising water when it is introduced in the freezer and an easier way to remove the mixing device surrounded by ice from the mould. Additionally, the upper part protects the ice from other frozen foods stored in the freezer and avoids cross-contamination of the ice which may affect the taste of the final beverage.

Preferably, in the assembly of an upper and a lower dismountable parts, the upper part comprises an upper inlet for water and overflow apertures.

The upper part enables an easy filling of the mould. Usually the overflow apertures are set at a level preventing that the upper end part of the mixing device is frozen.

According to a third aspect, there is provided a system of:
an apparatus for mixing and storing a beverage, said apparatus comprising:
a container body, comprising a floor and a sidewall extending upwardly and longitudinally from the floor to an upper edge,
a removable and rotatable mixing device positioned within the container body,
a motor cooperating with the mixing device through the floor of the container body in order to rotate the mixing device,
and
a mould for freezing an ice shape from water around said mixing device of the apparatus, wherein said mould comprises a compartment for receiving and storing water and the mixing device.

Preferably, in this system:
the mixing device of the apparatus comprising a connecting means designed to removably engage with a positioning means inside the apparatus,
and
the bottom of the compartment of the mould presents a means to fix said mixing device of the apparatus inside the compartment, said fixing means engaging with the connecting means of the mixing device.

According to a fourth aspect, there is provided a method for producing a mixing device, a part of said mixing device being covered with ice, with a mould such as described above, said method comprising the steps of:
a) fixing the mixing device in the compartment of the mould by engaging the connecting means of the mixing device with the fixing means at the bottom of the compartment of the mould,
b) filling the compartment of the mould with water,
c) freezing water in the mould,
d) removing the mixing device covered with from the mould.

According to a fifth aspect, there is provided a mould for freezing an ice shape from water, said ice shape being designed to fit around the mixing device of an apparatus for mixing, storing and drinking a beverage, said mixing device being configured to rotate inside the apparatus,
wherein said mould comprises a compartment for receiving and storing water, and
wherein the centre of the compartment is designed to reproduce the external shape of the mixing device.

As a result, the ice shape produced from said mould presents a shape complementary to the external shape of the mixing device and this moulded ice shape can be positioned around the mixing, which becomes covered with ice.

According to a sixth aspect, there is provided a method for producing a mixing device, a part of said mixing device being covered with ice, with a mould according to the above fourth aspect, said method comprising the steps of:
a) filling the compartment of the mould with water,
b) freezing water in the mould,
c) removing the moulded frozen piece of ice from the mould,
d) covering the mixing device with the moulded frozen piece of ice.

In the present application the terms "upper", "lower" and "bottom" are used to describe the relational positioning of features of the invention. These terms should be understood to refer to the mould in its normal orientation when positioned to freeze ice and to the apparatus in its normal orientation for the production of a beverage as shown in the FIGS. 6 and 3 respectively The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures:

FIG. 10b is a vertical cross section of the mould of FIG. 10a, FIG. 10c is a perspective view of an ice shape produced from the mould of FIG. 10a.

DETAILED DESCRIPTION OF THE DRAWINGS

Figure 1:
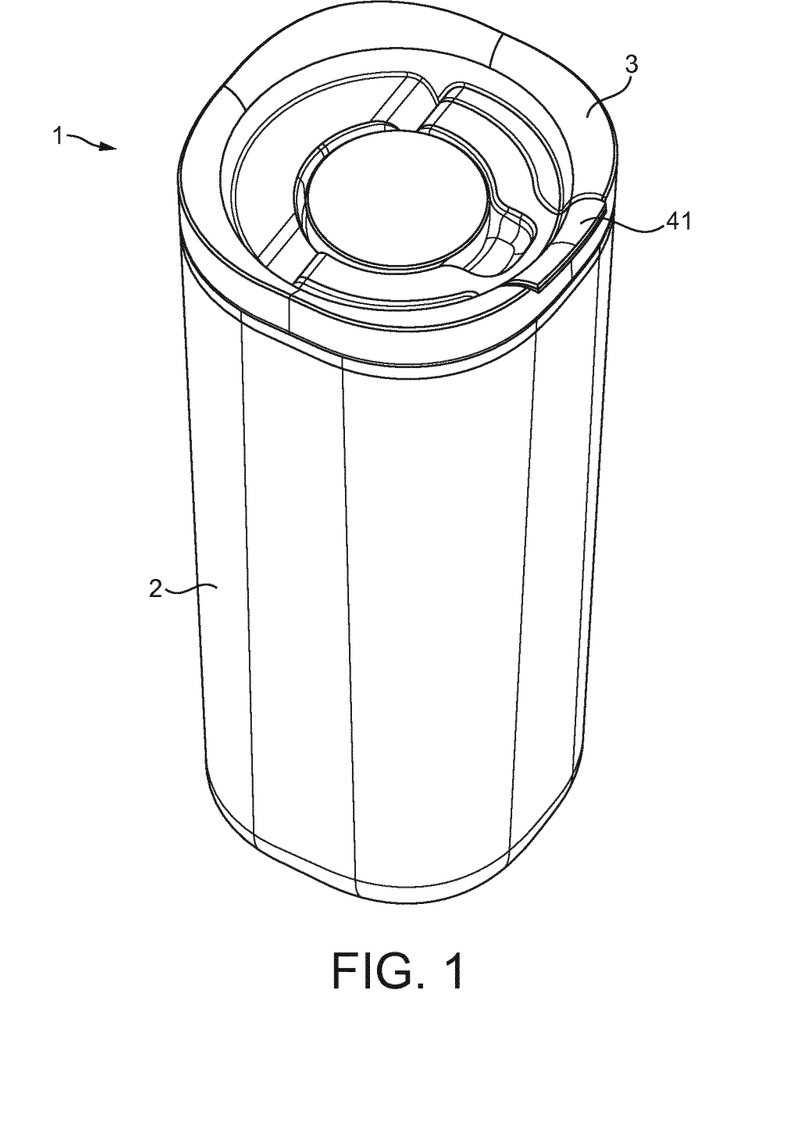
FIG. 1 is a perspective view of an apparatus for mixing, storing and drinking a beverage such as used in the present invention.

FIG. 1 illustrates an apparatus 1 for mixing, storing and drinking a beverage used in the present invention. The apparatus is configured for preparing a beverage and storing this beverage. Preferably the apparatus is configured for being transported in order to enable the consumer to drink on the go while travelling.

The apparatus comprises a container body 2 to store the beverage. Generally this container body is made of an insulated material in order to keep the beverage at the desired temperature. Usually, the apparatus is non disposable.

The apparatus comprises a lid 3 to close the container body 2. This lid closes the apparatus and is configured for enabling the consumer to drink therethrough. Accordingly the lid comprises an opening for drinking. In FIG. 1, this opening is closed by a movable member 41.

Figure 2:
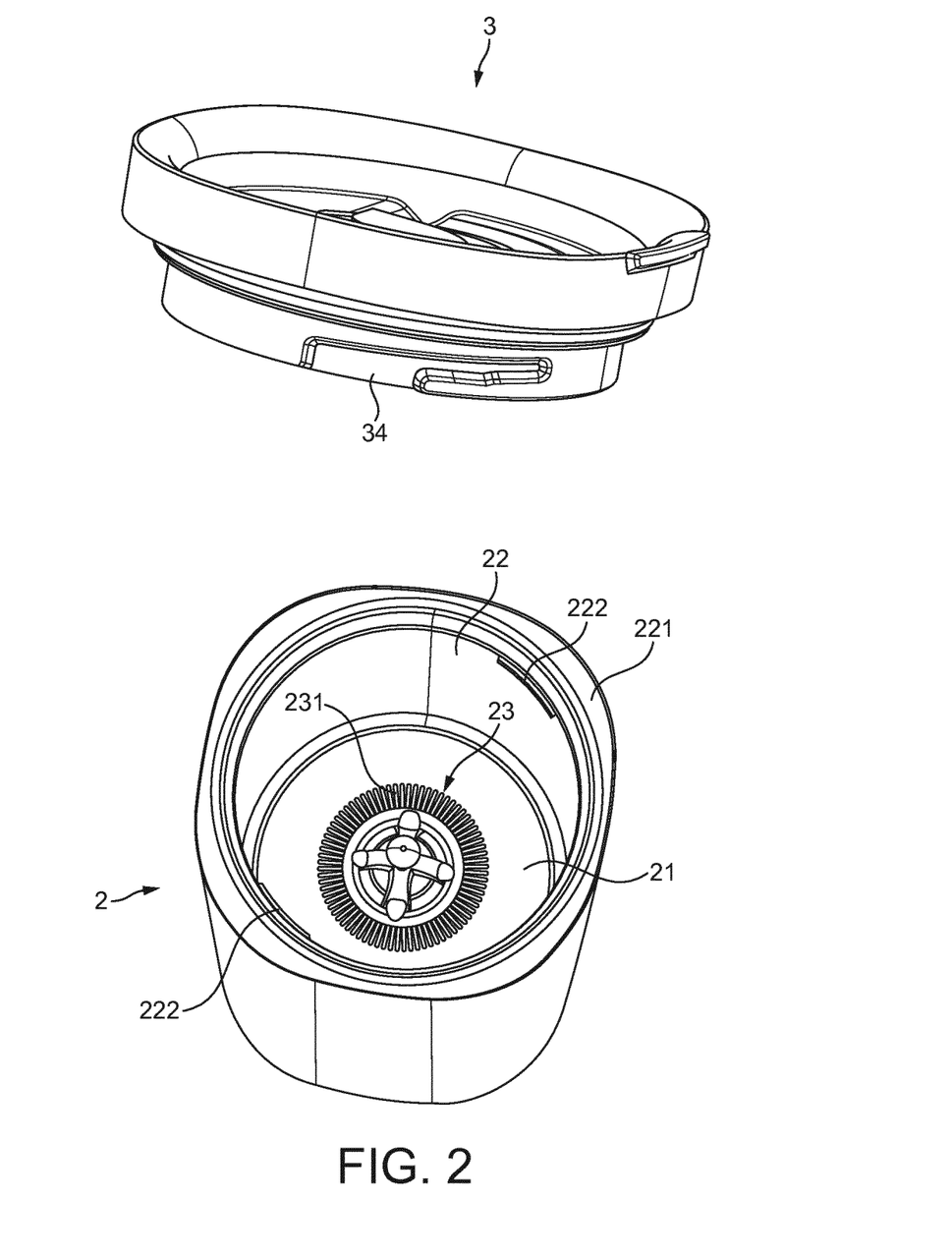
FIG. 2 is a perspective view of the lid and the container body of the apparatus of FIG. 1.

FIG. 2 illustrates the lid 3 separated from the container body 2. The container presents at its upper edge 221 means 222 for attaching the lid 3 to said edge and the lid 3 comprises corresponding cooperating attaching means 34. In the illustrated embodiment, the cooperating attaching means are bulges 222 and tracks 34. Yet any other current attaching means can be used like screwing means or snap fitting means.

FIG. 2 illustrates the inside of the container body. At the bottom, the container body 2 comprises a floor 21. The sidewall 22 extends therefrom upwardly and longitudinally to the upper edge 221.

As illustrated, the apparatus 1 comprises a mixing device 23 within the container body 2. Preferably, and as illustrated, the mixing device 23 is positioned at or close to the floor 21 of the container body. Generally, the mixing device is rotated around the longitudinal axis XX' of the container body (illustrated in FIG. 3). As a result, during rotation, beverage rotates in the container body and swirls along the sidewall 22 of the container body.

The mixing device can be a whisk, a whipper, a stirrer or any other device known for agitating a beverage. In the illustrated embodiment, the mixing device 23 comprises a toroidaly-shaped coil 231.

In the less preferred embodiment, the mixing device 23 can be directly attached to the shaft of a rotating motor extending through the floor 21 of the container body.

Figure 3:
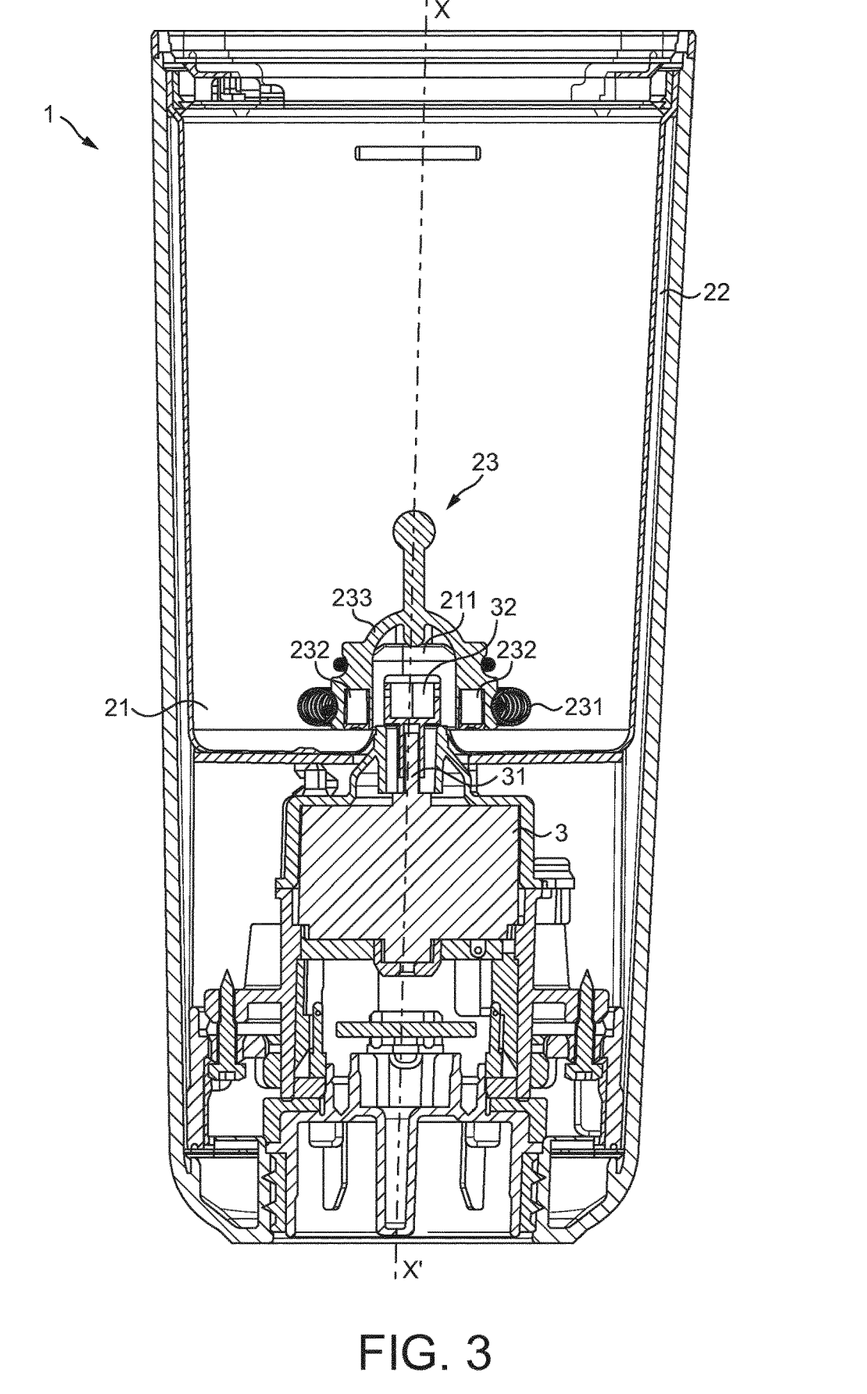
FIG. 3 is a vertical cross section view of the apparatus of FIG. 1.

Yet, as illustrated in FIG. 3, in the preferred embodiment, the apparatus 1 comprises magnetic drive means providing indirect coupling with the mixing device. The drive means comprises a motor 3 positioned under the floor 21 and actuating the rotation a shaft 31. The shaft extends along the longitudinal axis XX'. The end of the shaft comprises two elements 32 made of ferro-magnetic material. As a result, the rotation of the shaft induces a rotary magnetic field. The mixing device 23 comprises two elements 232 made of ferro-magnetic material. These elements are slaved to the magnetic field induced by the rotation of the shaft.

Figure 4:
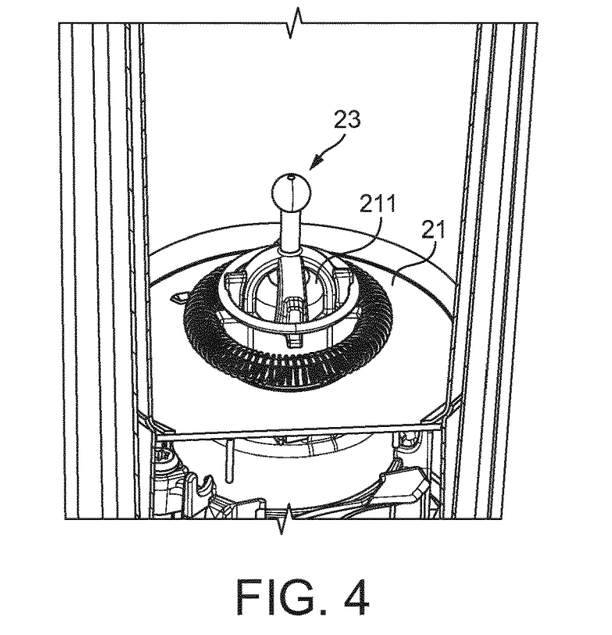
FIG. 4 shows the bottom of the container body with the mixing device attached thereto.

In FIG. 3 and FIG. 4, perspective view of the bottom 21 of the container body of the apparatus, the floor comprises a positioning means 211 configured to removably engage with a corresponding connecting means 233 of the mixing device. The positioning means 211 is a bump raising from the surface of the floor. On the other side of the surface of the floor, this bump comprises the end of the shaft of the motor.

On the side of the mixing device 23, the connecting means is a recess 233 at the centre of the mixing device designed to fit and surround the bump (FIG. 3).

The positioning means 211 has a shape complementing the connecting means 233 so as to accept the latter in rotational engagement.

Figure 5:
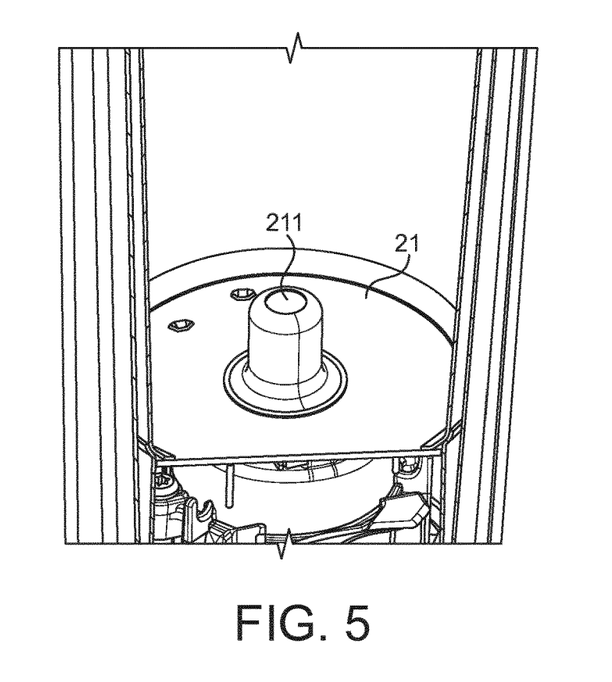
FIG. 5 shows the bottom of the container body without the mixing device.

FIG. 5 is a perspective view of the bottom 21 of the container body of the apparatus wherein the mixing device has been removed and showing the shape of the bump 211 used as positioning means.

Figure 6:
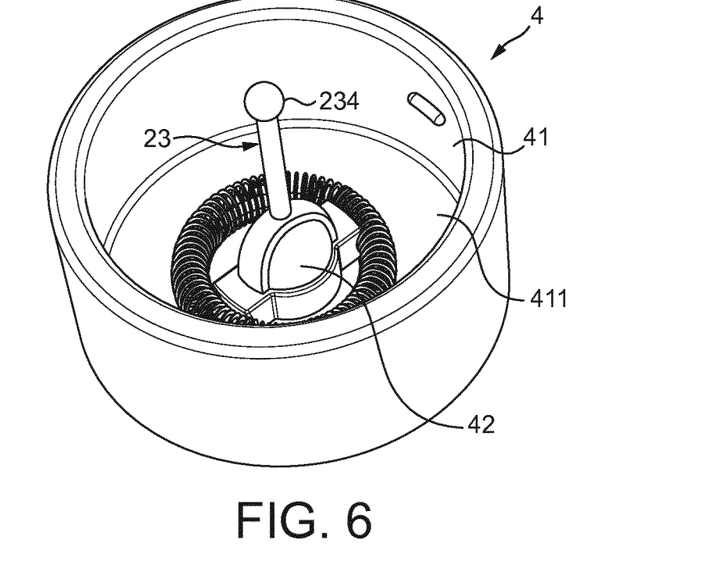
FIG. 6 is a perspective view of a mould for freezing ice around a mixing device according to the invention.

FIG. 6 is a perspective view of a mould 4 for freezing an ice shape from water around the mixing device 23 of the apparatus such as illustrated in FIGS. 1 to 5.

The mould comprises a compartment 41 in which the mixing device 23 can be introduced and fixed. The bottom 411 of the compartment comprises a fixing means 42 configured for cooperating with the mixing means 23. Precisely, the fixing means 42 is able to engage with the connecting means 233 of the mixing device. In the illustrated embodiment and particularly in FIG. 7, the fixing means 42 presents a shape that fully matches the empty space defined by the connecting means 233 of the mixing device: in the illustrated embodiment, it is a dome shape. Yet other types of shapes can be implemented.

As a result the mixing device is efficiently fixed to the bottom of the compartment. The fixing means 42 is positioned at the centre of the compartment meaning that, when the compartment 41 is filled with water and placed in a horizontal tray in a freezer, then water can homogeneously freeze around the mixing device. The homogeneous and symmetric final shape of the mixing device with ice parts is important in order to enable the further easy introduction of the mixing device in the apparatus and the efficient rotation of the mixing device to cool and mix the beverage in the apparatus.

Preferably the mould is made of a flexible and resilient soft material like a silicone plastic. This type of material presents the advantage of being partially compressible and the shape of the fixing means 42 can completely fill the empty space defined by the connecting means 233 of the mixing device even if it is a little bit larger. Then, after freezing, the presence of ice in this part of the mixing device is avoided.

As a result of the engagement of the fixing means 42 with the cooperating means 233 of the mixing device, the fixing means 42 prevents the freezing of ice in the connecting means 233 of the mixing device. Accordingly, when the mixing device with a part of said mixing device wrapped in ice, is positioned in the apparatus, the mixing device can still be correctly positioned in the container body in order to cooperate with the motor.

Figure 8A:
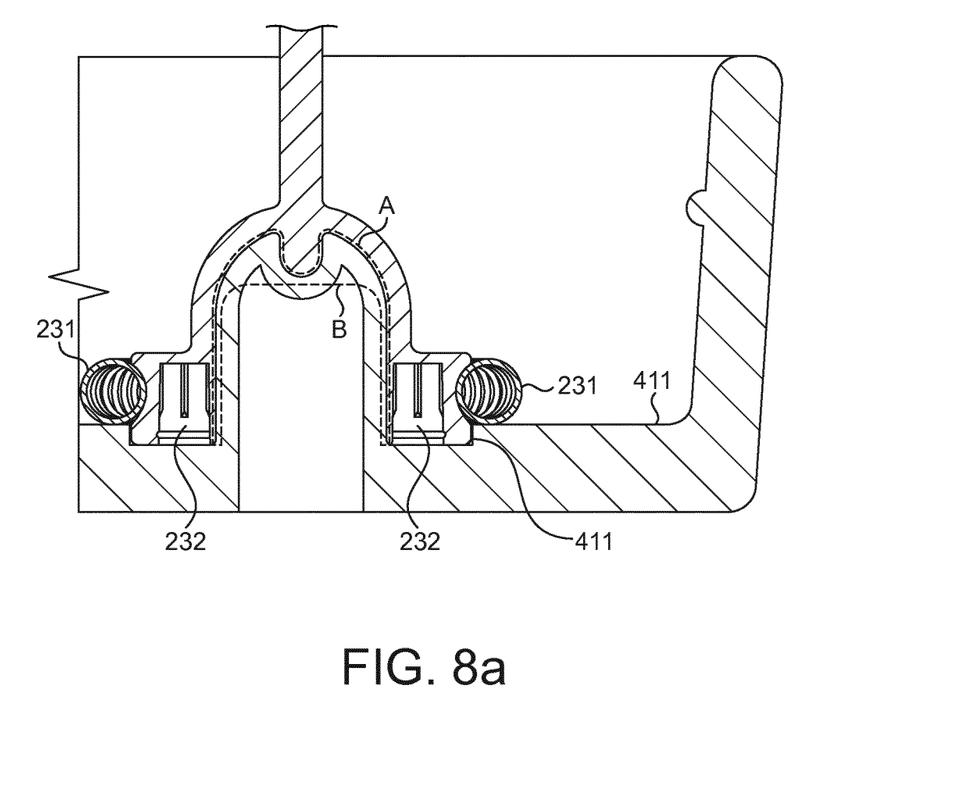
FIG. 8a is comparative view of the shapes of the fixing means of the mould and the positioning means of the container body of the apparatus.

Generally, as illustrated in FIG. 8a, the fixing means of the compartment presents a shape A (illustrated by dotted points) at least as large as the external shape B (illustrated by dotted points) of the positioning means of the apparatus. As a result, it is sure that the interface of the mixing device with the positioning means of the apparatus is not dilled with ice.

Preferably, the compartment 41 presents such a height h (FIG. 7) that, when the mixing device 23 is engaged with the fixing means 42 of the compartment, the upper end part 234 of the mixing device opposed to the connecting means 233 juts over the upper edge 412 of the compartment. This prevents the mixing device from being fully covered from ice and it enables the user to grab the mixing device easily in order to set it back in the apparatus.

Figure 7:
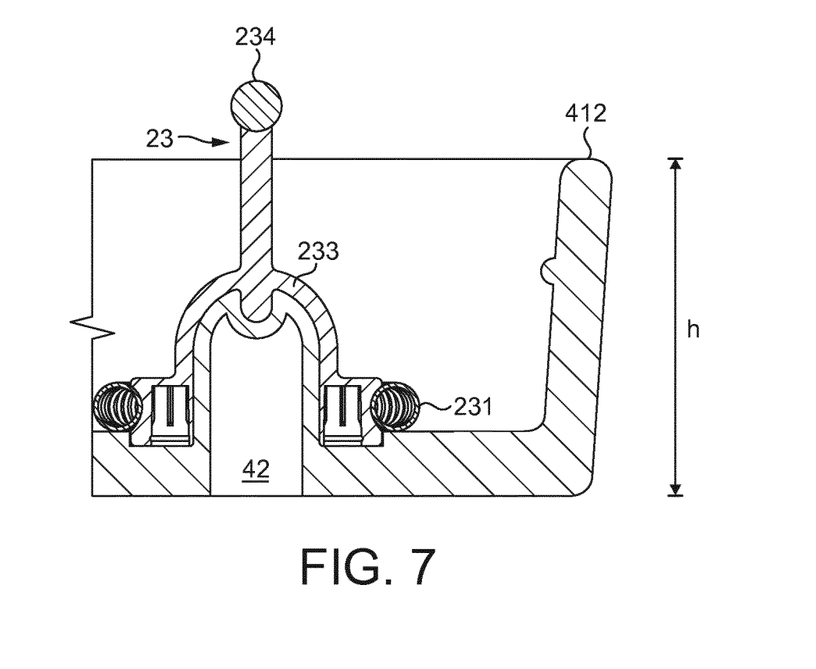
FIG. 7 is a vertical cross section view of the mould and the mixing device of FIG. 6 along plane P.

In addition, the surface 411 of the bottom of the compartment presents a shape configured to mould the lower surface of the mixing device when the mixing device 23 is fixed in the mould 4. In the particular illustrated mode, the upper surface 411 of the bottom of the compartment presents a recess 4111 that reproduces the profile of the bottom surface of the mixing device.

Figure 8B:
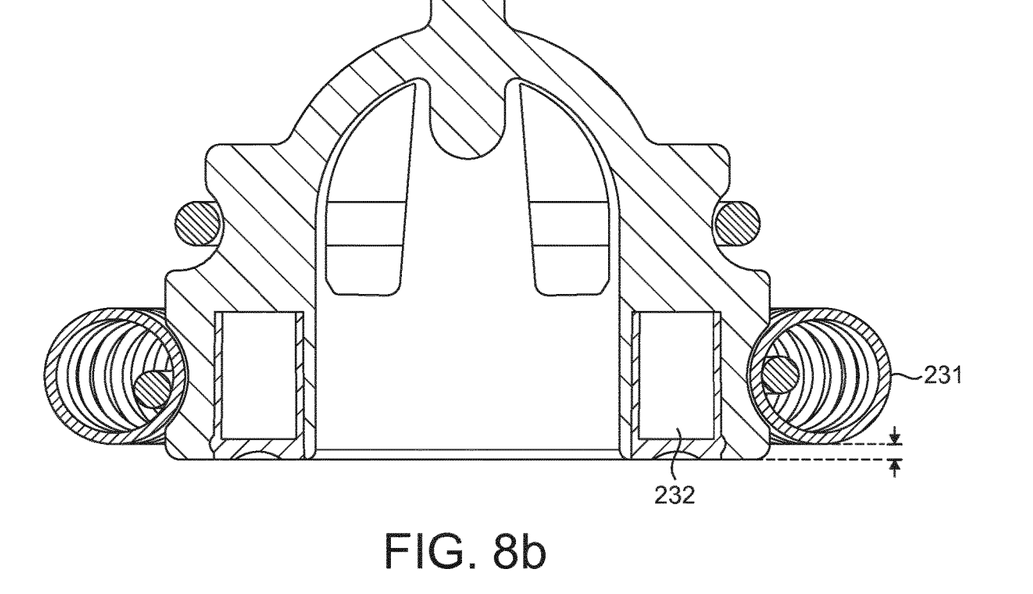
FIG. 8b is a vertical cross section of the mixing device.
Figure 8C:
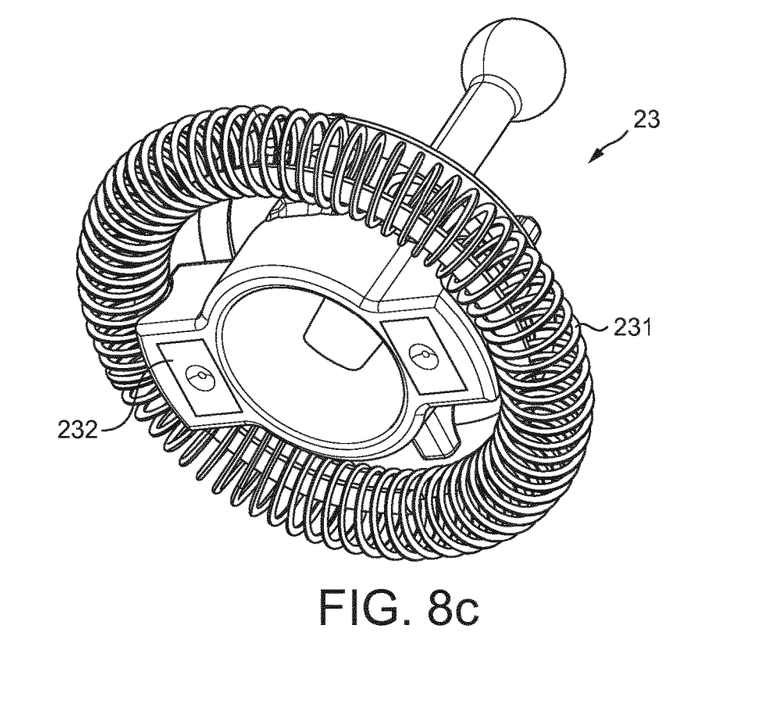
FIG. 8c is a perspective view of the bottom of the mixing device.

Actually as illustrated in FIGS. 8b and 8c, the bottom surface of the mixing device is not fully flat: the central part holding the ferro-magnetic elements 232 (coloured in grey in FIG. 8c) juts over the lower surface of the coil 231. The surface of the bottom of the mould reproduces the shape of the bottom of the mixing device perfectly. Due to this perfect match between the surfaces of the mould and the mixing device, no ice is able to freeze at the bottom surface of the mixing device and the connection either in the connecting means 233 or under the surface of the mixing device. No layer of ice is present at the bottom of the mixing device when it is removed from the mould. Then, when the mixing device covered with ice is introduced in the apparatus, the ice does not prevent the rotation of the mixing device.

In the illustrated embodiment, the internal shape of the compartment is designed to mould a cylinder of ice around the mixing device. Yet other shapes can be produced.

The largest external dimension of the ice shape shall remain inferior to the diameter of the container body of the apparatus.

FIGS. 9a to 9f illustrate the method for producing a mixing device with a part being wrapped in ice. The method is illustrated with a particular mould made of two dismountable parts 41a, 41b.

Figure 9A:
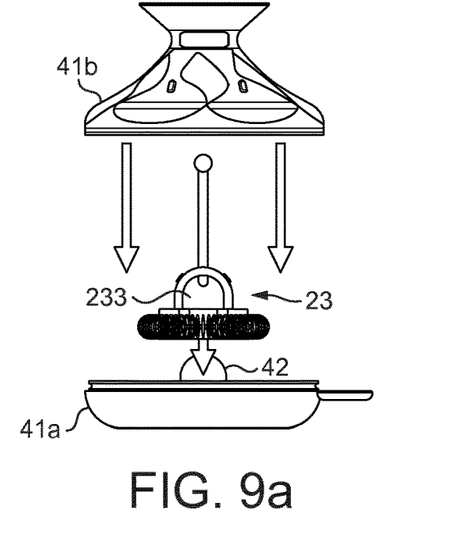
FIGS. 9a to 9f illustrate the method for producing a mixing device with a part being wrapped in ice according to the third aspect.

In FIG. 9a, the two parts 41a, 41b forming the compartment of the mould are separated and the mixing device 23 is positioned inside: the mixing device 23 is fixed in the lower compartment 41a by engaging the connecting means 233 of the mixing device with the fixing means 42 at the bottom of the compartment of the mould. Then the upper part 41b of the compartment is attached to the lower part 41a and accordingly the resulting compartment surrounds the mixing device 23.

Figure 9B:
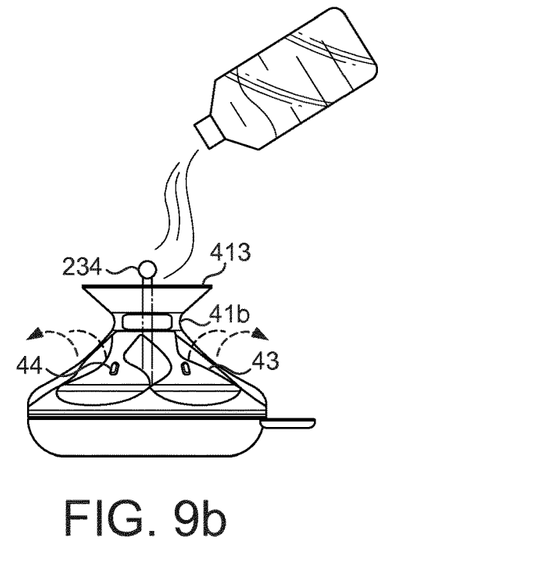

The upper part 41b of the compartment comprises an upper opening 413 and the upper end 234 of the mixing device is able to pass through as illustrated in FIG. 9b. The upper opening is sufficiently large to enable the filling with water therethrough as illustrated. Preferably, this opening presents the shape of hopper to facilitate the filling with water. The upper part can comprise overflow apertures 43 in order to control the level of water to be poured inside the container and as a result the shape of the ice wrapping the mixing device. This shape is also controlled by the internal shape of the upper and lower compartments 41a, 41b.

Figure 9C:
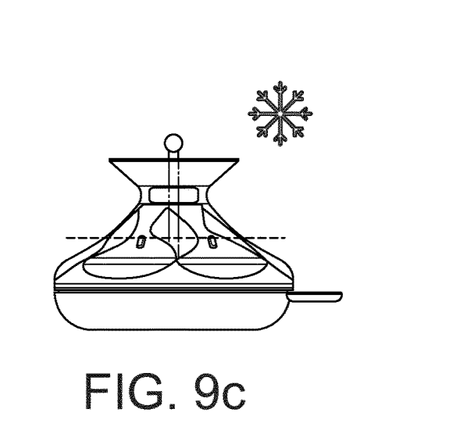

In FIG. 9c the mould is placed in a freezer on a horizontal support and water freezes around the mixing device.

Figure 9D:
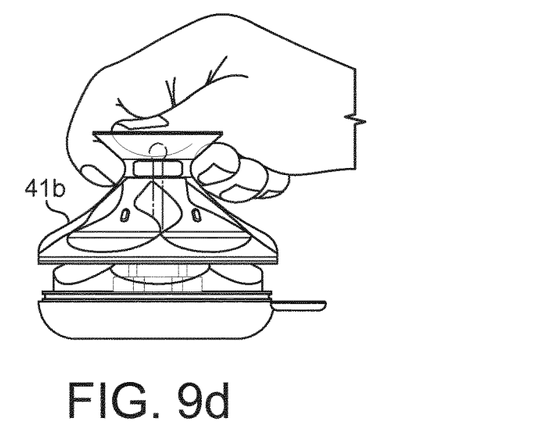
Figure 9E:
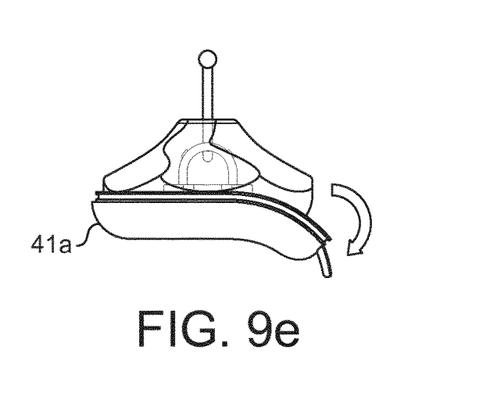
Figure 9F:
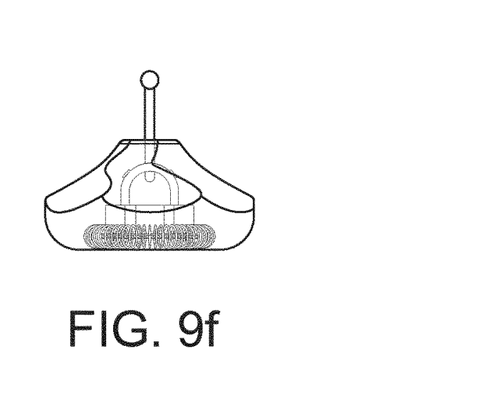

When a cold beverage is to be prepared, the mould is removed from the freezer and the mixing device wrapped with ice is extracted from the mould by removing the upper and lower parts 41b, 41a as illustrated in FIGS. 9d and 9e. FIG. 9f illustrates the resulting mixing device.

Figure 10A:
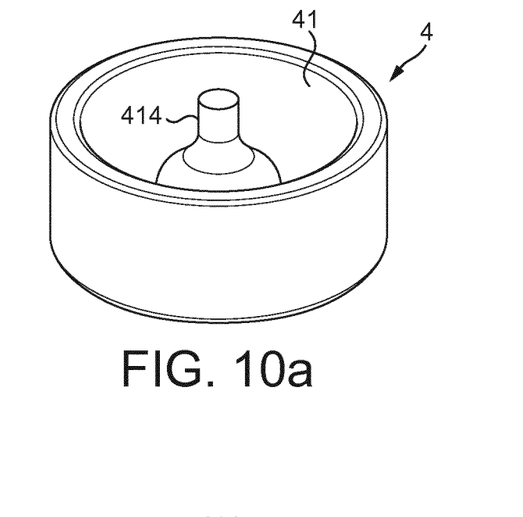
FIG. 10a is a perspective view of a mould used in the method according to the fourth aspect of the invention.
Figure 10B:
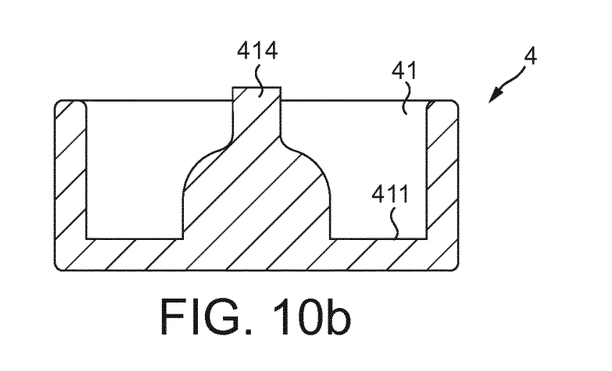

FIGS. 10a and 10b illustrates a mould used in the method according to the fourth aspect of the invention. The mould 4 comprises a compartment 41 for receiving and storing water. The centre of the compartment comprises a shape 414 erecting from the bottom 411 of the compartment and designed to avoid the freezing of ice at the centre of the compartment. This shape 414 reproduces the upper external surface of the mixing device.

Figure 10C:
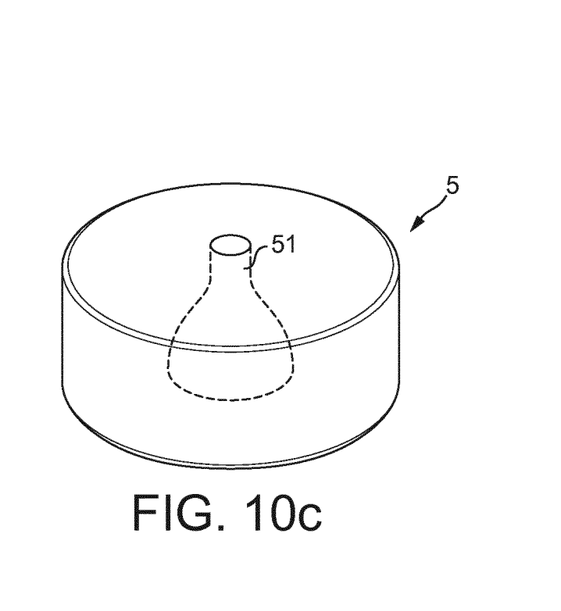

FIG. 10c illustrates the piece of ice 5 produced from the mould of FIGS. 10a and 10b. The external shape of the piece of ice is a cylinder. The centre of the cylinder presents an empty space 51 with a shape designed to match with the external upper shape of the mixing device. Consequently, this shaped piece of ice can be slid on the upper end part 234 of the mixing device, cover the upper surface of the mixing device and provide a mixing device covered by ice. The bottom of the mixing device is not covered by ice and can still cooperate with the positioning means of the apparatus.

Example—Preparation of a Cold Coffee

In a first preparation step, a mixing device wrapped with ice was prepared with the mould illustrated in FIG. 6.

The mould was filled with 40 ml of water and frozen in a freezer at −18° C.

After several hours, the mould was removed from the freezer and then the mixing device was removed from the mould. Then, the mixing device wrapped with ice was introduced in the apparatus illustrated in the FIGS. 1 to 3.

166 ml of water at 20.8° C. and 3 g of instant coffee powder were introduced in the apparatus and the motor was actuated at a speed of 1500 rpm during at least 35 seconds.

After 35 seconds, the resulting coffee beverage presented a temperature of 5° C. and a thin layer of foam at its top.

After 60 seconds, the resulting coffee beverage presented a temperature of 4.6° C. and a layer of foam at its top of 5 mm.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS apparatus 1
container body 2
   floor 21
      positioning means 211
   sidewall 22
      upper edge 221
      bulge 222
mixing device 23
   toroidal-shaped coil 231
   ferro-magnetic element 232
   connecting means 233
   upper end part 234
mould 4
   compartment 41
   lower part 41*a*
   upper part 41*b*
   bottom 411
   recess 4111
   upper edge 412
   upper opening 413
   shape 414
   fixing means 42
   overflow aperture 43
piece of ice 5
empty space 51

The invention claimed is:

1. A method for preparing a cold beverage with an apparatus for mixing and holding the cold beverage, the apparatus comprising:
   a container body, wherein the container body comprises a floor and a sidewall extending upwardly and longitudinally from the floor to an upper edge,
   a removable and rotatable mixing device positioned within the container body, wherein the removable and rotatable mixing device comprises a connector designed to removably engage with a corresponding positioner at the floor of the container body, and
   a motor cooperating with the removable and rotatable mixing device through the floor of the container body in order to rotate the removable and rotatable mixing device,
   the method comprises:
   receiving and storing water and the removable and rotatable mixing device in a compartment of a mould;
   engaging a bottom of the compartment with the connector of the removable and rotatable mixing device to fix the removable and rotatable mixing device inside the compartment of the mould;
   freezing an ice shape from the water around the removable and rotatable mixing device in the mould;
   providing the removable and rotatable mixing device, a part of the removable and rotatable mixing device being covered with the ice shape;
   positioning the removable and rotatable mixing device in the container body in order to cooperate with the motor;
   introducing at least one beverage liquid in the container body; and
   actuating the motor to rotate the removable and rotatable mixing device in the at least one beverage liquid.

2. The method according to claim 1, wherein the at least one beverage liquid is a ready-to-drink beverage.

3. The method according to claim 1, wherein the at least one beverage liquid comprises at least one soluble beverage ingredient and at least one aqueous liquid diluent that are introduced in the container body.

4. The method according to claim 1, wherein the apparatus comprises a heater, and the heater is switched on before and/or at the beginning of the step of actuating the motor to rotate the removable and rotatable mixing device in the at least one beverage liquid.

5. The method according to claim 4, wherein the heater comprises a heating stick or a serigraphic heating plate.

6. The method according to claim 1, wherein the compartment of the mould comprises an upper opening, wherein the removable and rotatable mixing device fixed inside the compartment positions an upper end of the removable and rotatable mixing device passing through the upper opening.

7. The method according to claim 1, wherein the compartment of the mould defines an internal shape that shapes the water into the ice shape around the removable and rotatable mixing device, wherein the internal shape has rotational symmetry around an axis of rotation of the removable and rotatable mixing device.

8. The method according to claim 1, wherein the removable and rotatable mixing device comprises at least one of a blade or a whisk.

9. The method according to claim 1, wherein the apparatus is a drinking container.

10. The method according to claim 1, wherein the apparatus comprises a removable lid that cooperates with the upper edge of the container body to close the container body hermetically.

* * * * *